United States Patent [19]

Middlebrook

[11] Patent Number: 5,713,740
[45] Date of Patent: Feb. 3, 1998

[54] SYSTEM AND METHOD FOR CONVERTING WRITTEN TEXT INTO A GRAPHICAL IMAGE FOR IMPROVED COMPREHENSION BY THE LEARNING DISABLED

[76] Inventor: R. David Middlebrook, 47 Hemlock Cir., Princeton, N.J. 08540

[21] Appl. No.: 655,699

[22] Filed: Jun. 3, 1996

Related U.S. Application Data

[63] Continuation-in-part of Ser. No. 184,493, Jan. 18, 1994, Pat. No. 5,556,282.
[51] Int. Cl.[6] .................................................. G09B 21/00
[52] U.S. Cl. ........................ 434/178; 434/156; 434/159; 434/167
[58] Field of Search ........................ 434/156, 157, 434/167, 169–172, 176, 178–180, 112, 159, 308, 309, 317

[56] References Cited

U.S. PATENT DOCUMENTS

| | | | |
|---|---|---|---|
| 4,661,074 | 4/1987 | Walker | 434/178 |
| 4,907,971 | 3/1990 | Tucker | 434/167 |
| 5,057,020 | 10/1991 | Cytanovich | 434/178 |
| 5,306,153 | 4/1994 | Foster | 434/170 |
| 5,336,093 | 8/1994 | Cox | 434/178 |

*Primary Examiner*—Richard J. Apley
*Assistant Examiner*—Glenn E. Richman
*Attorney, Agent, or Firm*—LaMorte & Associates

[57] ABSTRACT

A system and method which enables individuals to rapidly and accurately obtain information about the contents of a written text without having to read the words of the text. Written text, which is comprised of graphic markings that represent linguistic sound, forms a graphic image. This graphic image can be mapped in various ways to illustrate and provide insight about the structure and content of the text with regard to one or more selected features. Individuals can perceive the graphic information contained in the text using parafoveal and peripheral vision, thereby enabling those individuals to process the graphic information using visual/spacial cognitive abilities. The present invention system and method therefore enables a person to understand a large amount of information about the body of written text without reading the words comprising the body of written text. The image of the text is then mapped in various ways to illustrate, without words, the various features of the text that provide insight into the contents of the text.

20 Claims, 8 Drawing Sheets

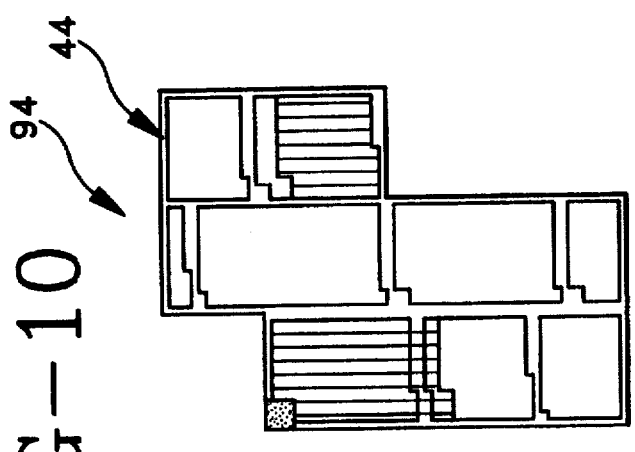
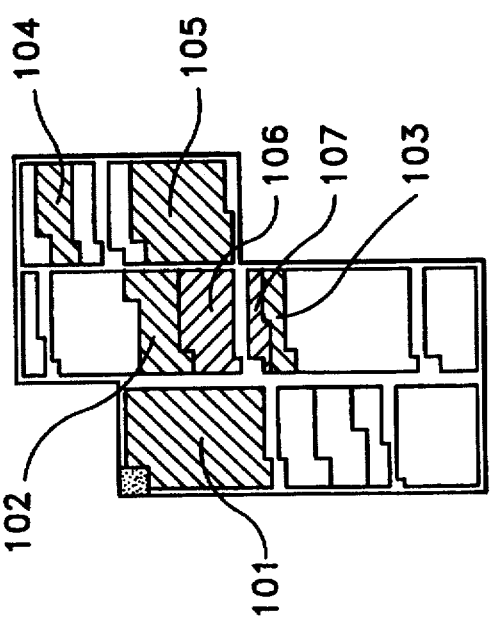
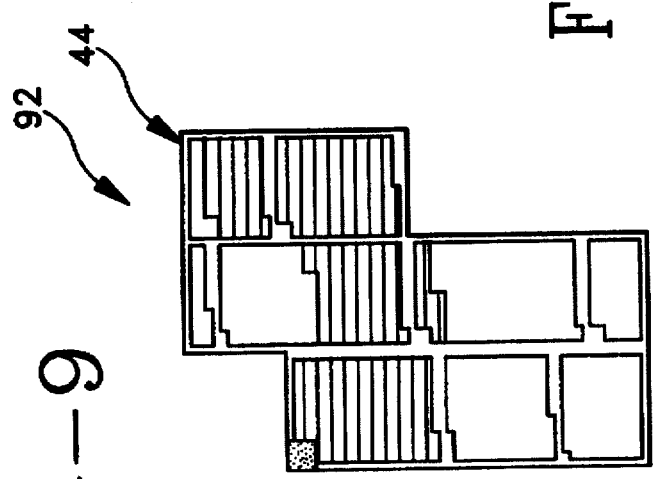

SYSTEM AND METHOD FOR CONVERTING WRITTEN TEXT INTO A GRAPHICAL IMAGE FOR IMPROVED COMPREHENSION BY THE LEARNING DISABLED

RELATED APPLICATIONS

This application is a continuation-in-part of U.S. patent application Ser. No. 08/184,493, filed Jan. 18, 1994, U.S. Pat. No. 5,556,282, by the inventor herein and entitled METHOD FOR THE GEOGRAPHICAL PROCESSING OF GRAPHIC LANGUAGE TEXTS.

BACKGROUND OF THE INVENTION

1. Field of the Invention

The present invention relates to systems and methods relates to systems and methods which enable individuals to quickly and accurately obtain information about the contents of a written text without having to read the words of the text.

2. Prior Art Statement

Reading and writing require the extensive use of a number of genetically inherited abilities. Some of the most important of these abilities are foveal vision, auditory processing and sequential processing.

Traditional reading techniques regard text as sound. The standard approach to reading calls for text to be perceived by means of foveal vision, decoded as auditory information, structured as auditory sequences and comprehended as auditorally-based abstract concepts. Since it is these very abilities that are often deficient in a learning disabled person, it can be seen why it is so difficult for a learning disabled person to efficiently read written text. In attempting to teach the learning disabled, educators have often tried correct the deficits and deficiencies of an individual. Since such deficits and deficiencies are genetic in nature, such attempts often find only limited success. In contrast, the present invention focuses upon the abilities of the learning disabled person that are not deficient. As will be explained, the present invention does not attempt to change the abilities of the individual, rather it changes the way written text is presented so that learning disabled people who have normal abilities in the areas of spatial processing and/or parafoveal vision can use these abilities to better comprehend text.

It is therefore an objective of the present invention to provide a system and method to enable learning disabled individuals to use their visual/spatial abilities and/or parafoveal/peripheral vision instead of, or in addition to, their auditory abilities and/or foveal vision for comprehending written text.

SUMMARY OF THE INVENTION

A system and method which enables individuals to rapidly and accurately obtain information about the contents of a written text without having to read the words of the text. Written text, which is comprised of graphic markings that represent linguistic sound, forms a graphic image. This graphic image can be mapped in various ways to illustrate and provide insight about the structure and content of the text with regard to one or more selected features. Individuals can perceive the graphic information contained in the text using parafoveal and peripheral vision, thereby enabling those individuals to process the graphic information using visual/spacial cognitive abilities. The present invention system and method therefore enables a person to understand a large amount of information about the body of written text without reading the words comprising the body of written text. The image of the text is then mapped in various ways to illustrate, without words, the various features of the text that provide insight into the contents of the text.

BRIEF DESCRIPTION OF THE DRAWINGS

For a better understanding of the present invention, reference is made to the following description of an exemplary embodiment thereof, considered in conjunction with the accompanying drawings, in which:

FIG. 3 shows a second base typographic map of an exemplary textscape produced by the embodiment of FIG. 1;

FIG. 9 shows a spread map for the third most prevalent noun contained within the fourth section of the detail typographic map shown in FIG. 4;

FIG. 10 shows a spread map for the fourth most prevalent noun contained within the fourth section of the detail typographic map shown in FIG. 4;

FIG. 11 shows a composite spread map of the fourth section of the detail typographic map shown in FIG. 4, wherein the composite spread map shows the area of intersection should the maps of FIG. 7, FIG. 8, FIG. 9, and FIG. 10 be combined.

DETAILED DESCRIPTION OF THE INVENTION

The present invention system and method enables individuals to capitalize on the graphic information inherent in written language texts in order to improve reading speed and comprehension. Written text, which is comprised of graphic markings that represent linguistic sound, forms a graphic image. This graphic image can be mapped in various ways to illustrate and provide insight about the structure and content of the text with regard to one or more selected features. Individuals can perceive the graphic information contained in the text using parafoveal and peripheral vision, thereby enabling those individuals to process the graphic information using visual/spacial cognitive abilities. The present invention system and method therefore enables a person to understand a large amount of information about the body of written text without reading the words comprising the body of written text.

The present invention system and method changes a body of written text into a graphic image that does not contain readable words, or contains very few readable words. By converting a body of text into an image, the body of text can be analyzed by using a person's visual/spatial abilities and parafoveal/peripheral vision. Since the visual/spatial abilities and parafoveal/peripheral vision of a learning disabled person are often normal, the present invention system and method enables a disabled person to understand a large amount of information about the body of written text without reading the words comprising the body of written text.

Figure 1:
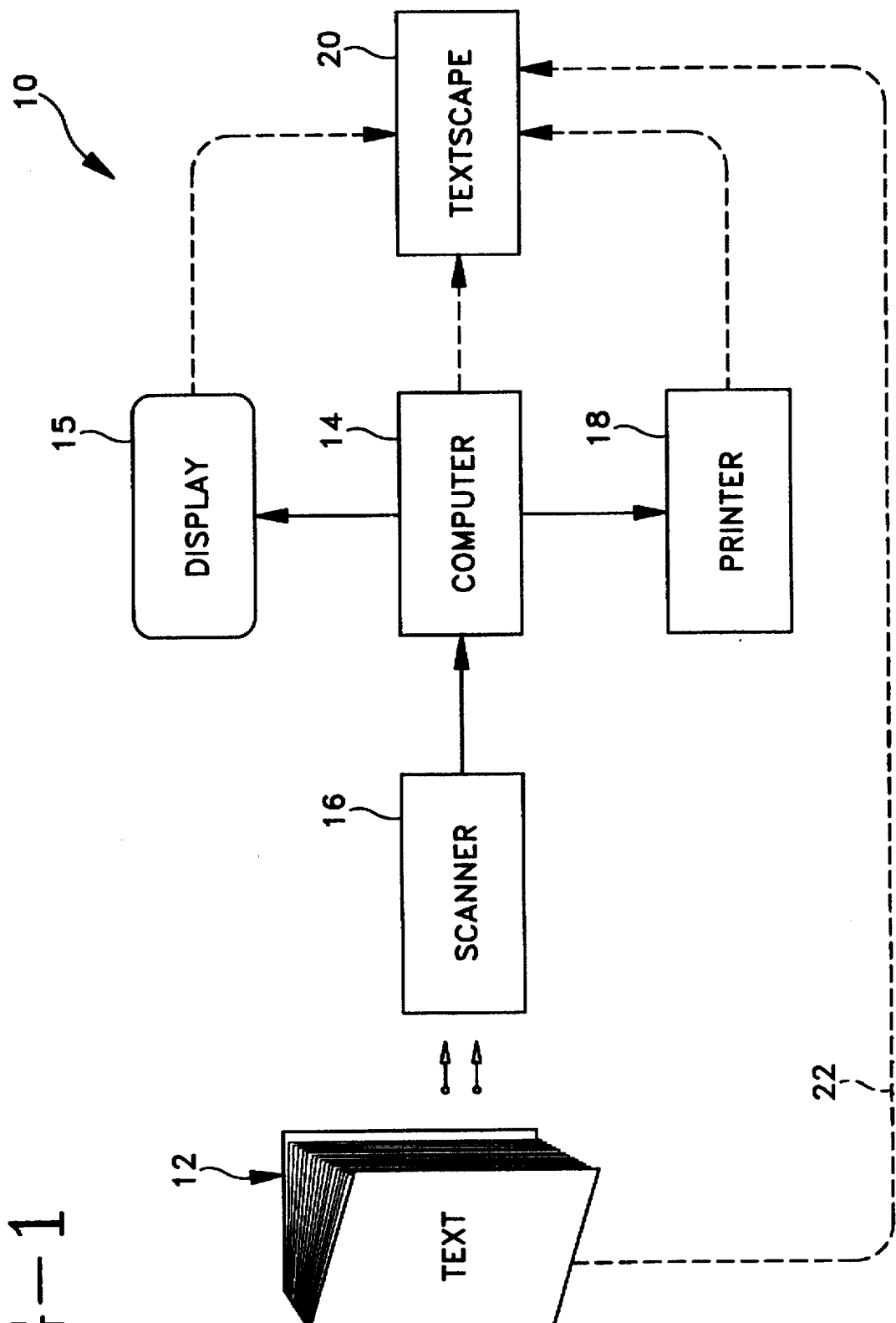
FIG. 1 is a schematic view of one preferred embodiment of the present invention.

Referring to FIG. 1, an overview of one preferred embodiment of the present invention system 10 is shown. The purpose of the system 10 is to convert the text from a written body of text 12 into a graphic image that does not contain words that are individually decipherable. For the purposes of this disclosure, any graphic representation of written text is referred to as a "textscape". A textscape may contain recognizable words, or it may contain space and/or graphic markings in place of one or more words. In a textscape which contains words the words may or may not be individually decipherable. In the shown embodiment, a body of text 12 is scanned into a computer 14 using a scanner 16. The body of text 12 can be any written material, such as a book, newspaper, magazine, musical score or the like. Once a desired section of text is read into the computer 14, the computer 14 converts the written text into a corresponding textscape 20. The textscape 20 can then be either viewed on the display 15 of the computer 14 or printed onto paper by a printer 18 coupled to the computer 14.

It will be understood that the production of a textscape 20, from a body of text, using a scanner 16 and a computer 14 is merely exemplary and other means can be employed. For example, text need not be scanned into the computer 14, but rather can be read from a disc or electronically sent to the computer via a modem or other network connection. Furthermore, the use of the computer 14, scanner 16 and printer 18 can be eliminated by manually producing the textscape 20, as indicated in FIG. 1 by line 22. Manually producing the textscape 20 may include copying the text and placing the graphic images on a single display to create the textscape 20.

The textscape 20, being a graphic representation of a section of the body of text 12, is essentially a map of the selected section of the body of text 12. As will be explained, different maps of the textscape 20 are created to graphically depict different things about the text 12. By reading one or more mappings of a particular textscape, a learning disabled person may learn a great deal about the organization and context of the text without reading the text, in the same way that a person can learn about a city by viewing different types of maps for the same city. For example, by reading a topographic map, road map, bus route map, tourism map, tax map and political precinct map for a city, a person can learn about the size of a city, the important parts of the city, the business sections and residential sections of the city and the like without ever having to read text describing the city. As will be explained, by viewing different maps of a common textscape 20, a learning disabled person is able to tell what a given body of text is about, what parts of the text address different topics, how large the body of text is, and a great deal of other information about the body of text 12. The information obtained about the body of text 12 is obtained without having to read the words contained within the body of text 12.

Figure 2:
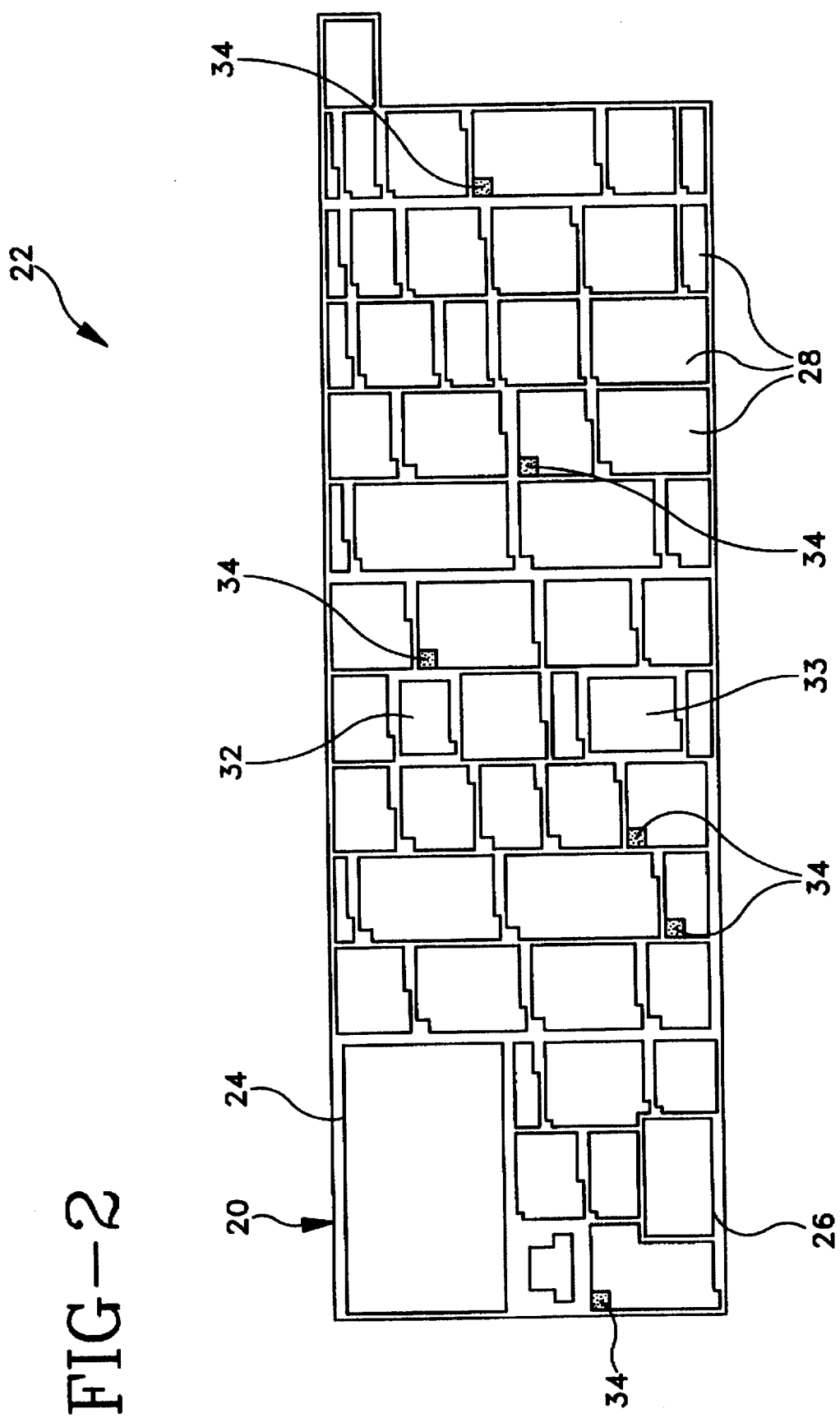
FIG. 2 shows a first base typographic map of an exemplary textscape produced by the embodiment of FIG. 1.

Referring to FIG. 2, there is shown a first base typographic map 22 of a textscape 20. In the example shown, the textscape 20 was created from a forty one paragraph article about labor wages in the housing and manufacturing industries. The textscape 20 is a single image that contains the entire article. If the textscape 20 is to be printed on paper, it is preferably made as a single sheet of paper or scroll of paper that can be scanned all at once by the eyes. If the textscape 20 is viewed on an electronic display, the textscape 20 is formatted so that it can be rapidly scrolled across the screen from one end of the textscape 20 to the other, either with a side-to-side motion or with a up-and-down motion.

To create the base typographic map 22 of the textscape 20, shown in FIG. 1, the text of the article is reduced in size until the entire text can be viewed as a continuous whole within the confines of the display area. This may require that the text be reduced to a size where the majority of the text cannot be read by the eye. The entire reduced sized article is then displayed as a single display. The base typographic map 22 provides its viewer with basic information about the length and structure of the text, as well as the flow of information contained within the text. For example, the length of the text can be seen from the base typographic map 22. Furthermore, it can be seen that the text includes two illustrations 24, 26 and forty one paragraphs 28. From the base typographic map 22, it can also be seen that two sections 32, 33 of a paragraph 28 near the center of the article were set by the typographer with a more narrow column width than the other columns. The narrow sections 32, 33 may be assumed to be a quotation since it is a common typographic convention to indent block quotations within a body of text.

Six small block areas 34 are apparent when viewing the base typographic map 22. The six small block areas 34 are graphical representations of six large alphabetic characters used within the body of text. Typographers commonly use oversized alphabetic characters to mark points of transition within a text. In the base typographic map 22, the six small block areas 34 are identical in size and color. As such, a person viewing the six small block areas 34 can assume that the alphabetic characters that the six small block areas 34 represent are of the same typeface style and point size. The six small block areas 34 indicate that the text is divided into six separate sections, wherein the forty one paragraphs 28 comprising the full text are unequally divided among the six sections.

The base typographic map 22 in FIG. 2 does not contain readable alphabetic characters. Consequently, the use of foveal vision is not necessary to analyze the textscape 20. Furthermore, the base typographic map 22 contains no words to be converted into sound information, which means that with regard to reading, auditory processing ability is of no use. The base typographic map 22, however, may be easily read using parafoveal/peripheral vision and visual/spatial processing.

Referring to FIG. 3, a second base typographic map 40 is shown for the textscape 20. As with the base typographic map 22 in FIG. 2, the second base typographic map 40 shows the two illustrations 24, 26 contained within the article. The sections 32, 33 of the block quotation are shown as is the title block 31. The six small block areas 34 are also shown, wherein each of the block areas 34 represents a single alphabetic character that marks the beginning of a new section of text. The second base typographic map 40 of FIG. 2, however, does not show the individual paragraphs contained within the text. Rather, the text is divided into six sections 41, 42, 43, 44, 45, 46 wherein each section begins with one of the six small block areas 34. Each of the six sections 41, 42, 43, 44, 45, 46 is blocked so that a person viewing the second base typographic map 40 can see the size of each of the six sections 41, 42, 43, 44, 45, 46, but cannot tell how many paragraphs are contained within each of the sections 41, 42, 43, 44, 45, 46.

Figure 4:
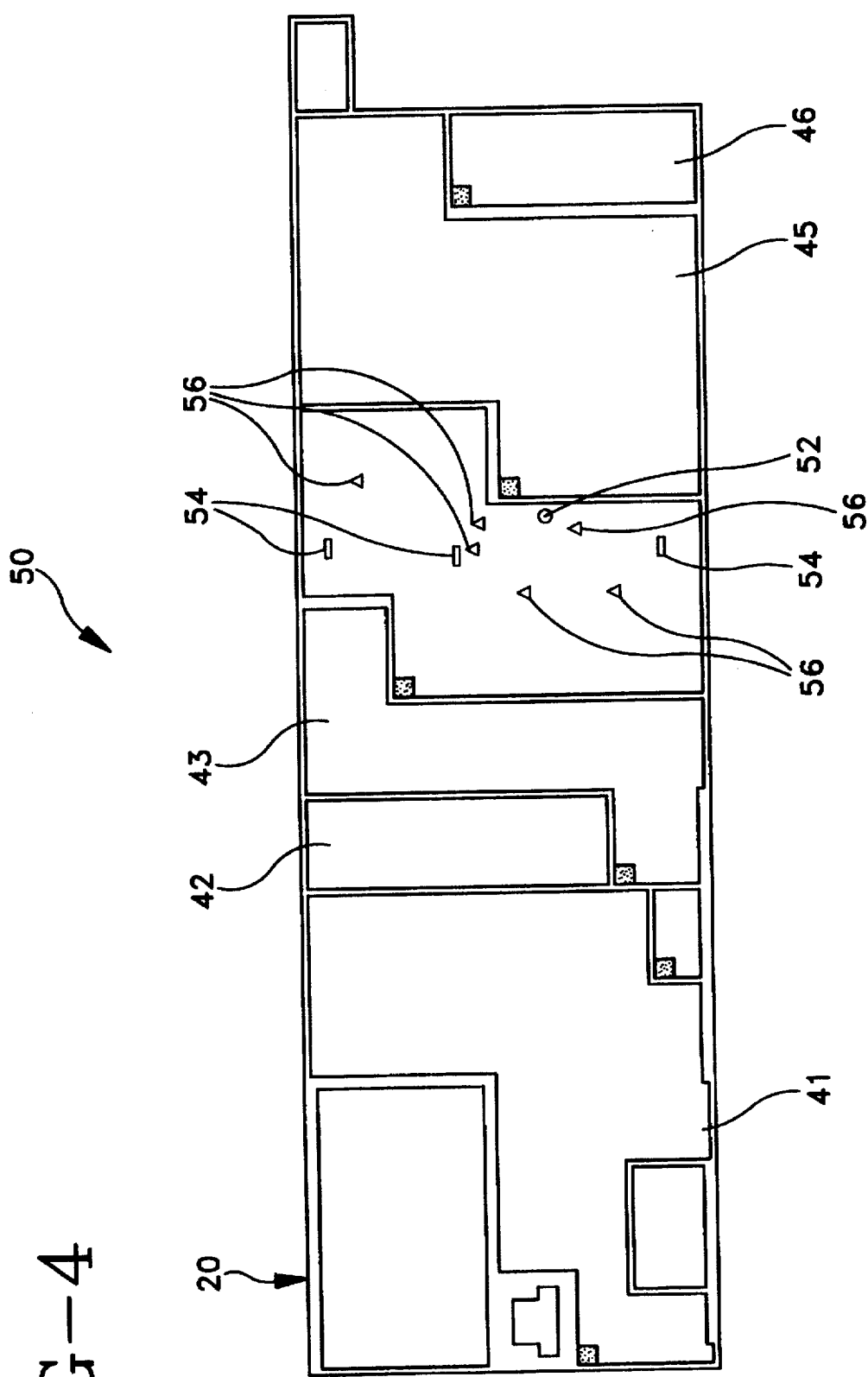
FIG. 4 shows a detail typographic map of an exemplary textscape produced by the embodiment of FIG. 1.
Figure 4:
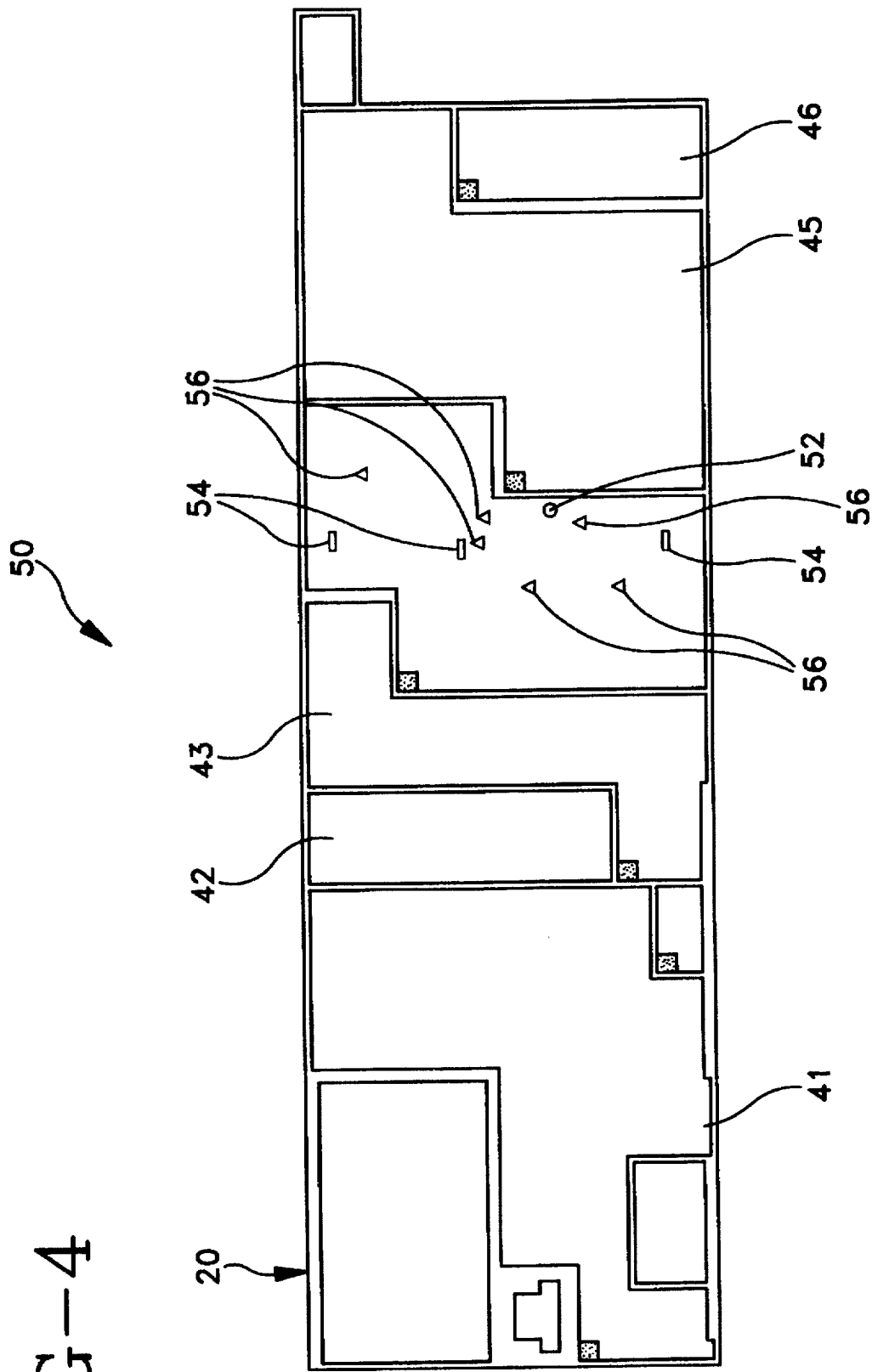

Referring to FIG. 4, a detail typographic map 50 is shown for the textscape 20. To create the detail typographic map 50, a target text feature is selected. A target text feature can be a word, punctuation symbol, space or indentation. In the present example, the target feature is a base word. The process of selection for the target base word will later be explained. For purposes of illustration, the term "house" was selected as well as its related terms "houses" and "housing". The location of these related words are then graphically depicted on the detail typographic map 50. The term "house" is assigned the graphic symbol of an oval 52. The term "houses" is assigned the graphic symbol of a rectangle 54. Lastly, the term "housing" is assigned the graphic symbol of a triangle 56. The graphic symbols of the oval 52, rectangle 54 and triangle 56 appear in the detail typographic map 50 at the positions where the terms "house", "houses" and "housing", respectively, would have appeared in the text.

The most obvious information provided by the detail typographic map 50 is the location of terms "house", "houses" and "housing" in the textscape 20. All three terms are located within the fourth section 44 of the mapped text of the textscape 20. None of the other text sections 41, 42, 43, 45, 46 contain any references to "house", "houses" or "housing". On the basis of this graphic information, a person viewing the detail typographic map 50 can logically infer that the topic of house/houses/housing is discussed in the fourth section 44 of the mapped text and is probably not discussed anywhere else.

Another piece of information provide by the detail typographic map 50 concerns the distinction between the topic "houses", the topic "house" and the topic "housing". In the shown embodiment, the terms "house", "houses" and "housing" are each symbolized differently. Because the distinction between these three terms is noted on the detail typographic map 50, it can be clearly seen that there are six instances of "housing", two instances of "houses" and one instance of "house". Moreover, these instances do not appear to be clustered or segregated in any way which would suggest that "houses" is specific to one location, "housing" to another and "house" to yet another. On the basis of this information, one might reasonably infer that the sense of house/houses/housing in this context is most closely related to the general topic "housing" (which appears six times) and not to the general topics "houses" (which appears two times) or "house" (which appears only one time).

The detail typographic map 50 does not, however, provide information regarding the relative importance of the topic "housing". The fact that "housing" is discussed is clear. The fact that it is an important topic, or even the main topic, within the context of the fourth section 44 of the mapped text is not clear. The most that can be said is that the detail typographic map 50 shows that the words house/houses/ housing do appear in the fourth section 44 of the mapped text and that they are concentrated in, and thus probably specific to, the fourth section 44 of the mapped text.

Figure 5:
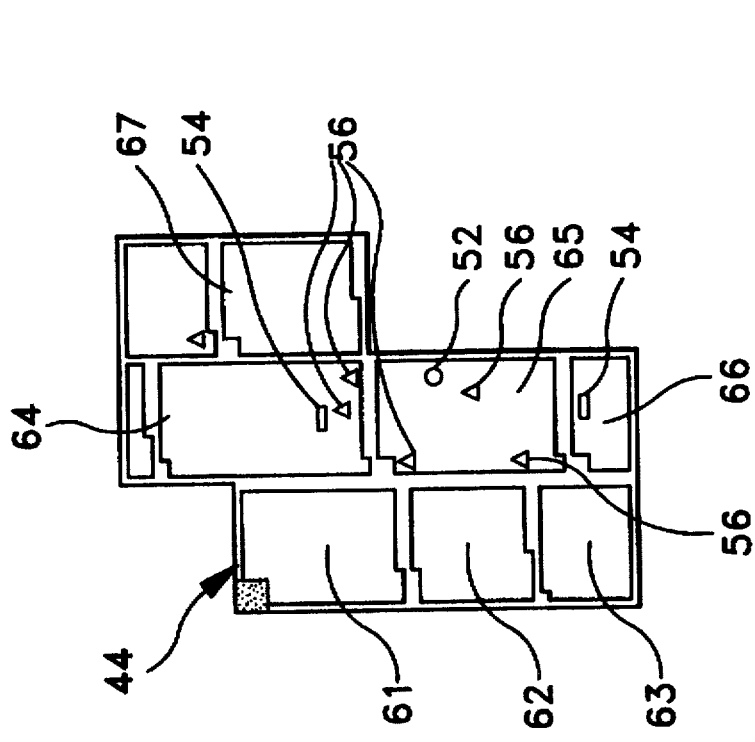
FIG. 5 shows a section-specific detail typographic map 60 of the fourth section of the detail typographic map shown in FIG. 4.

Referring to FIG. 5, a section-specific detail typographic map 60 is shown, wherein the section specific detail typographic map 60 shows only the fourth section 44 of the detail typographic map 50 shown in FIG. 4. By isolating the section of the mapped text containing certain key words, a viewer can better understand the overall importance of those key words in the context of the section, as well as in the context of the entire text. In FIG. 4, the paragraphs within each of the six sections of text were not shown. In FIG. 5, the paragraphs contained within the fourth section 44 of the mapped text are reintroduced. As can be seen, the section specific detail typographic map 60 shows that the fourth section 44 of the mapped text contains seven paragraphs 61, 62, 63, 64, 65, 66, 67. The oval 52 representing the term "house", the rectangles 54 representing the term "houses" and the triangles 56 representing the term "housing" are shown in the context of the seven paragraphs 61, 62, 63, 64, 65, 66, 67. As such, from the section specific detail typographic map 60, it can be seen that only three of the paragraphs contain one or more occurrences of "house", "houses" or "housing". No information is provided about the paragraphs that do not contain a reference to "house", "houses" or "housing".

Figure 6:
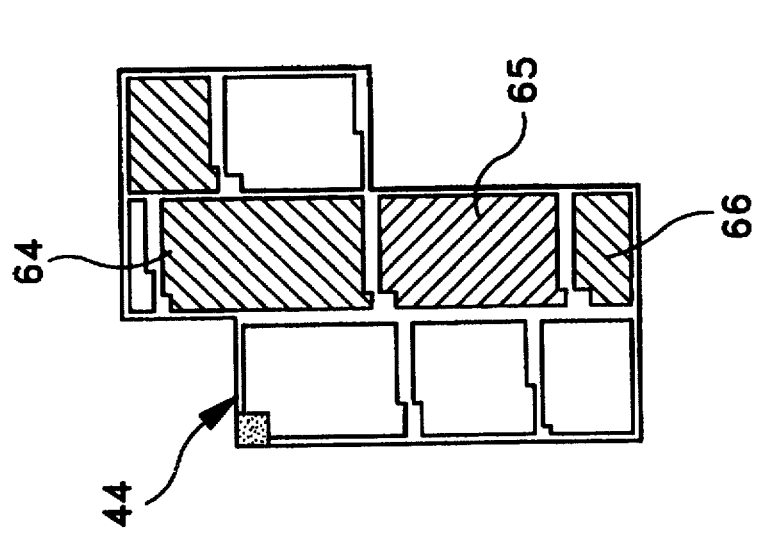
FIG. 6 shows a chorochromatic map of the fourth section of the detail typographic map shown in FIG. 4.

Referring to FIG. 6, a chorochromatic map 70 is shown of the fourth section 44 of the originally mapped text. In the chorochromatic map 70, the paragraphs 64, 65, 66 that contain a reference to the target terms, herein "house", "houses" or "housing", are hatched so as to become highly noticeable. As a result, a person viewing the chorochromatic map 70 can instantly tell which of the paragraphs contain the target terms. In the shown embodiment, the presence of the target term "house" or "houses" in a paragraph is indicated by the use of oblique hatching, such as is shown in paragraph 64 and paragraph 66. The presence of the target term "housing" in a paragraph is indicated by the use of reverse oblique hatching, as is shown in paragraph 65. As such, it will be understood that different hatchings can be used to indicate the presence or absence of different target terms in any of the paragraphs mapped.

Paragraphs that are not hatched do not contain occurrences of the target terms. With regard to the empty locations, it is important to consider the possibility that the information not mapped, i.e. the information which exists in the empty areas is more important than the nine instances of house/houses/housing already mapped. The problem is to find a way to get at and sort through the information in the empty areas without having to use foveal vision and auditory and sequential processing, i.e. without having to read the words of the text. One way of accomplishing this is to treat the text as statistical spatial data and to employ statistical techniques to sort, classify and select for mapping only those textual features which are likely to yield useful and relevant information about the text.

The detail typographic maps shown in FIGS. 4 and 5 and the chorochromatic map shown in FIG. 6 only convey to a viewer the location of certain target terms within the larger spatial context. No distinction is made as to the significance or insignificance of a target term.

By using statistical textmapping, the significance of a target term can be better interpreted. The primary factors used in statistical textmapping are frequency and location of target terms. Secondary factors include the graphic attributes, phonetic attributes, meaning and usage of the target terms.

The primary factor of frequency refers to the number of times a target term appears in a body of text. Frequency may be expressed in terms of a number, a percentage or a ratio. The primary factor of location refers to the physical location of a target term in a body of text. The location is definable as either a point or a zone. A point is where the target term actually appears. A zone is defined as any area larger than a point, such as the area occupied by a textual feature itself or the area occupied by a phrase, a clause, a sentence, a paragraph, a section, a chapter, an entire text or a collection of texts.

Information about frequency and location may be combined to produce information regarding a selected textual feature's distribution. For example, information on frequency and location can answer the question: "Does the textual feature appear more or less evenly throughout the text?". More specifically, such information can answer the questions: "Does the feature appear in one area of the text?" and "Can the influence of the textual feature be said to extend over a particular zone?". Information about frequency and location may also be combined with information about graphic attributes, phonetic attributes, meaning and/or usage. The result of which is a more refined representation of the specificity, distribution and spread of selected textual features within a text. Graphic attributes, as used herein, refer to the visual attributes of a textscape and how text is mapped on the textscape. Relevance is given to the size and shape of mapped textual features, the presence or absence of color, brightness, intensity, density, boldness, as well as recognizable gradiations, blendings and patterns. Phonetic attributes, as used herein, refer to all sound-based attributes useful for distinguishing homographs.

Figure 7:
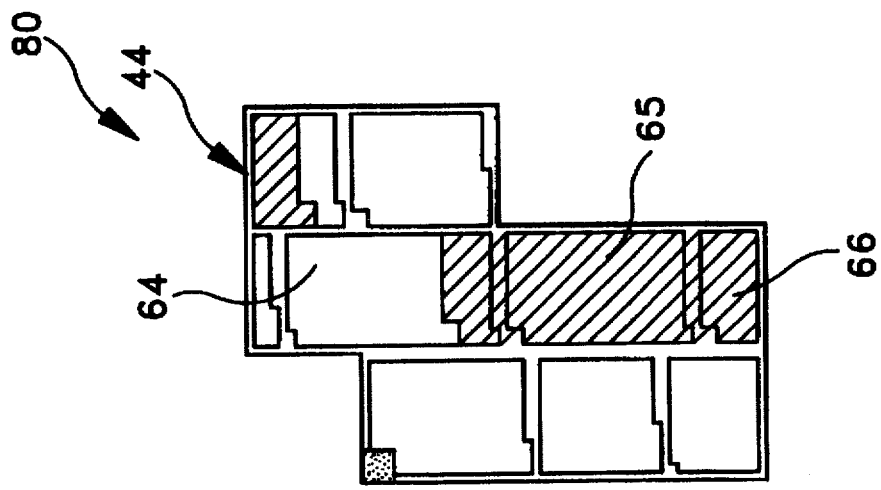
FIG. 7 shows a spread map for the second most prevalent noun contained within the fourth section of the detail typographic map shown in FIG. 4.

FIGS. 7, 8, 9, 10 and 11 show different spread maps for the fourth section 44 of the originally mapped text. Referring to FIG. 7, the target terms "house", "houses" and "housing" are treated as being equivalent. The basis of the spread map 80 in FIG. 7 is to determine whether a target term appears in two or more sequentially contiguous paragraphs. The end limits of the spread are determined by the first and last instances of the target term in question. In the spread map 80 shown in FIG. 7, the spread for the target terms house/houses/housing is shown by oblique hatching. The spread begins at the bottom of the fourth paragraph 64, extends across all of the fourth paragraph 64 and ends close to the bottom of the sixth paragraph 66.

Until this point, how the target terms "house", "houses" and "housing" were selected has not been explained. To analyze the information contained within a body of text, statistical techniques are used to analyze all of the text features contained within the original body of text. Each text feature is analyzed on the basis of its frequency, location, graphic attributes, phonetic attributes, meaning and/or usage. For example, in the case of the exemplary body of text 12 shown in FIG. 1, there are 4,425 different words and a total of 7,549 word instances. Of the 4,425 words, 3,720 (roughly 84%) of them occur only one time in the text. As such, 705 words occur more than once. The most frequently occurring word is "the" which occurs 387 times. The word "of" appears 190 times, "a" appears 114 times, and "and" appears 90 times. A similar listing of punctuation marks shows that there are, for example, 242 commas, 145 periods and 16 question marks. Such features are often very useful in determining text criteria such as whether or not a word is a verb or noun. However, for the sake of clarity, such words were eliminated from consideration in this example, as were all likely verbs, adjectives, adverbs, prepositions, conjunctions and articles. in this case, only possible nouns were considered.

In order to select the textual features to be mapped, a list of all possible nouns appearing in the text is then compiled, and the frequency of each noun is noted. The noun list is then ranked in descending order on the basis of frequency. Then each word is classified on the basis of its possible usage. The term "possible usage" is used here because it is often difficult to determine, out of context, the usage of a particular word. For example, the word "houses" means one thing when used as a noun and another thing when used as a verb.

After the most commonly occurring relevant words are found within a body of text, these words are then categorized so that related words can be identified. Where two or more terms are determined to be related, the term having the highest ranking on the basis of frequency may be declared the dominant word. All related terms may therein considered to be the same as the dominant word. Among the graphic attributes considered in categorizing terms are similarities in graphic structure, for example, "house", "houses" and "housing" all have in common the graphic root "hous". The usage and meaning of the words is also considered, wherein words with the same meaning are categorized as being the same. For instance, the term "house" may or may not mean the same thing as "residence", "domicile" and/or "home". A determination as to whether terms are related is done using statistical probabilities considering the occurrence of the terms and the spread of the terms in the overall context of the body of text.

In the embodiment of the present invention shown, a search of the initial text was conducted to find the dominant form of the four most frequent possible nouns occurring in the fourth section 44 of the text. Only the fourth section is being analyzed because it has been previously determined that the body of text in question is divided into six sections which may or may not be related by topic. As such, a conservative approach would be to analyze each of the six sections separately as well as the entire text as a whole.

The fourth section 44 of the mapped text includes twelve occurrences of the most prevalent noun, nine occurrences of the second most prevalent noun, seven occurrences of the third most prevalent noun and five occurrences of the fourth most prevalent noun. FIG. 7, as is known, shows the spread map 80 of the terms house/houses/housing. The terms house/houses/housing represent the second most prevalent noun contained within the fourth section 44 of the mapped text.

Figure 8:
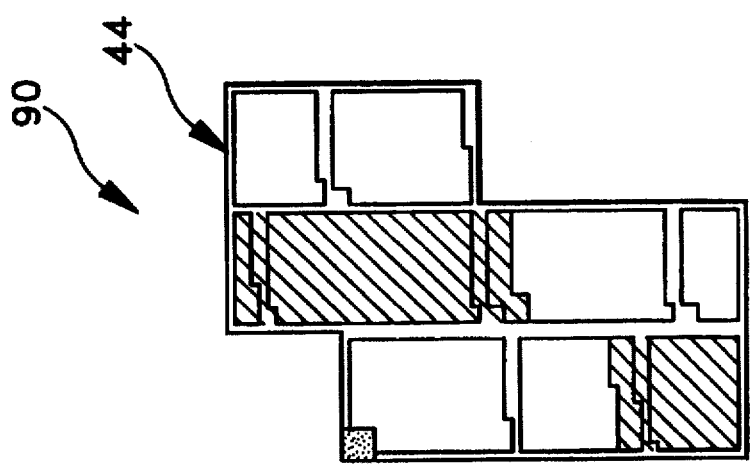
FIG. 8 shows a spread map for the first most prevalent noun contained within the fourth section of the detail typographic map shown in FIG. 4.

FIG. 8, FIG. 9 and FIG. 10 show spread maps for the first, third and fourth most prevalent nouns, respectively, found in the fourth section 44 of the mapped text. Since the first, third and fourth most prevalent nouns are not known to the viewer, such spread maps are blind mappings and do not provide any information about the identity of the nouns, other than their spread. In FIG. 8, the spread map 90 shows the spread area of the most prevalent noun with a reverse oblique hatching. In FIG. 9, the spread map 92 shows the spread area of the third most prevalent noun with a horizontal hatching. In FIG. 10, the spread map 94 shows the spread area of the fourth most prevalent noun with a vertical hatching.

Referring to FIG. 11, a composite spread map 100 is shown for the fourth section 44 of the mapped text that represents the combination of spread maps shown in FIGS. 7, 8, 9 and 10. In FIG. 11, the block areas 101, 102, 103, 104, 105 with widely spaced oblique hatching show areas in the fourth section 44 of the mapped text where two of the spread maps from FIGS. 7, 8, 9 and 10 intersect. As such, the block areas 101, 102, 103, 104, 105 contain references to two of the four most prevalent nouns. Block areas 106, 107 with reversed hatching show areas in the fourth section 44 of the mapped text where three of the spread maps from FIGS. 7, 8, 9 and 10 intersect. As such, the block areas 106, 107 contain references to three of the four prevalent nouns. No section of the fourth section 44 of the mapped text contains references to all four of the four most prevalent nouns.

From viewing the spread map 100 in FIG. 11, it can be inferred that the hatched block areas are the most likely to provide a reader with a quick and accurate overview of the subject discussed in the section. The fact that the information is in the form of a map suggests that the overview may be comprehended quickly. It is reasonable to expect that if one's goal is to gain an overview of the fourth section 44, one will save a considerable amount of auditory-based reading time by going first to the hatched block areas. The fact that the overview is likely to be accurate is a matter of probability based upon the multivariate statistical analysis. The results of this analysis show the following. Block areas 106, 107 represent the only locations in the section in which three of the previous section maps intersect. Block areas 101, 102, 103, 104, 105 are all similar in that they represent the intersection of two previous section maps. Block areas 101 and 105, however, by virtue of their locations within the first and last paragraphs of the section, are more likely to be useful with regard to establishing a general understanding of the subject discussed in the section than are the other block areas.

By viewing the section maps shown in FIGS. 7, 8, 9, 10 and 11, a viewer can determine what parts of the fourth section 44 of the mapped text are most likely to provide useful information. However, the viewer cannot determine the identity of the four most prevalent nouns used to create the section maps of FIGS. 7, 8, 9, 10 and 11. By visually comparing FIGS. 7, 8, 9, 10 and 11, it can be seen that all the hatched sections 101, 102, 103, 104, 105, 106, 107 in FIG. 11 are also contained in FIG. 9. FIG. 9 shows the section map for the third most prevalent noun. As such, it can be determined that all of the hatched sections 101, 102, 103, 104, 105, 106, 107 in FIG. 11 contain references to the third most prevalent noun in conjunction with the first, second and/or fourth most prevalent nouns. Since the third most prevalent noun is the only word common to all the intersections illustrated by FIG. 11, it can be ascertained that the third most prevalent noun somehow represents the general subject matter of the fourth section 44 of the mapped text. This information is ascertainable despite the fact that the first and second most prevalent nouns occur more often than the third most prevalent noun. From FIGS. 9, 10 and 11, it can be seen that the fourth most prevalent noun appears with the third most prevalent noun in the first and last paragraphs of the fourth section 44 of the mapped text. As such, it can be determined that the fourth most prevalent noun is nearly as important as the third most prevalent noun.

After viewing the text as a graphic image or textscape, the person viewing the various maps of the textscape can be shown or told the identity of the most prevalent nouns. In the shown embodiment, the most prevalent noun is "manufacturing". The second most prevalent noun, as mentioned earlier, is "housing". The third most prevalent noun is "wages" and the fourth most prevalent noun is "labor". Having previewed the text as graphic information, an individual may begin reading the words of the text as sound information with the intention of testing the inferences made by using the textmapping process. The most important inference is that the main topic of the section is labor wages in the housing and manufacturing industries.

Statistical textmapping is a powerful tool for decoding and comprehending written texts. It may be used for a variety of tasks including both reading and writing. For example, it may be used to map a text for concepts, arguments, information and the like or to reveal the structure, organization and flow of information and concepts within a text.

By comparing different maps of the same text and looking for patterns and intersections, the reader may, without actually reading the words of the text as sound information, determine which locations are most likely to yield the main point of the text. The reader can also determine which locations are most likely to contain specific details or more developed arguments, and which locations are likely to contain minor details, information of secondary importance or digressions from the main point. By viewing a composite map, such as that shown by FIG. 11, a reader can see that heavily intersected locations yield the most general information. Locations which contain very few or zero intersections are less likely to contain general information. They are, however, more likely to contain specific kinds of information, such as details, arguments, documentation and supporting quotations.

Ultimately, each individual reader and writer is responsible for deciding what is and what is not relevant to any given text. Relevance is critical to comprehension. Comprehension requires a conceptual leap across the gap between literal understanding and interpretive understanding. Textmapping provides a set of tools which can be used to help individuals read texts as visual spatial information, but textmapping cannot change the fact that true comprehension of phonetically-based written language texts ultimately depends upon an auditory-based reading technique. This does not mean, however, that textmapping cannot be used to supplement auditory-based reading.

Figure 12:
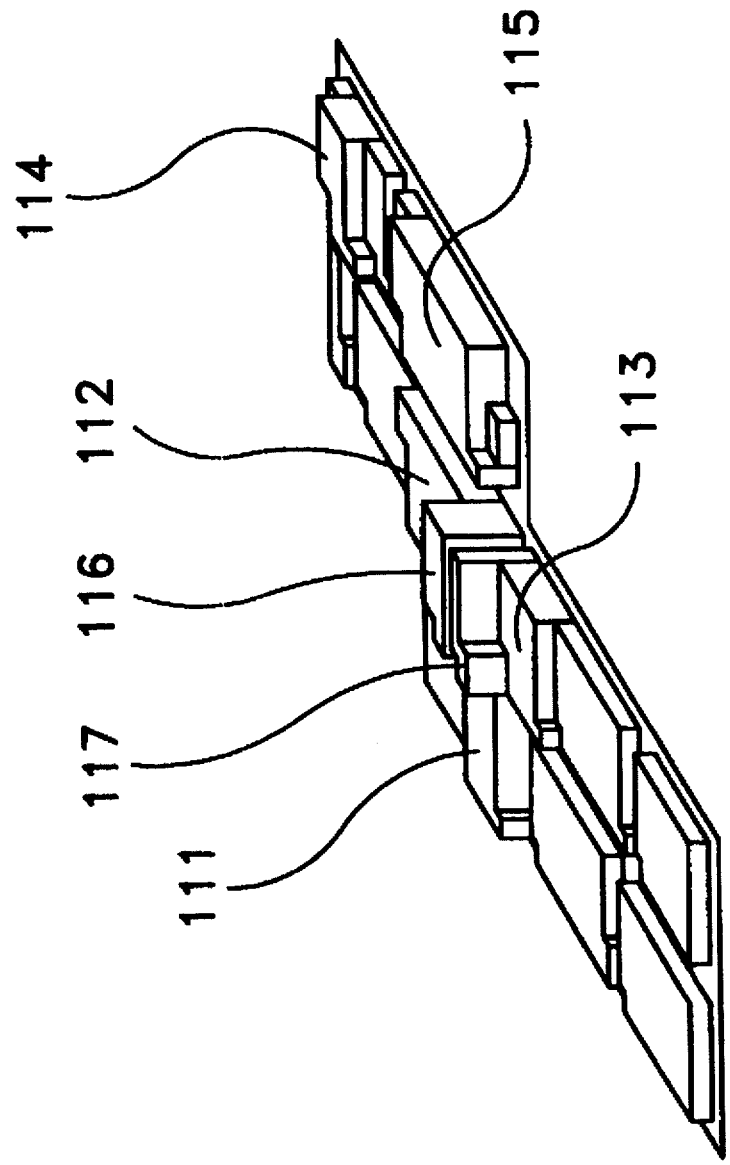
FIG. 12 shows a three-dimensional representation of the composite spread map shown in FIG. 11.

FIGS. 2-11 all show two dimensional maps. However, maps that depict a three-dimensional representation of information can also be used. Referring to FIG. 12, a three-dimensional representation is shown for the composite spread map 100 previously shown in FIG. 11. The difference is that in FIG. 12, the textscape is treated as a three-dimensional surface, while in FIG. 11, the textscape is treated as a two-dimensional plane. The three-dimensional blocks 111, 112, 113, 114, 115, 116, 117 in FIG. 12 correspond to the two-dimensional block areas 101, 102, 103, 104, 105, 106, 107 in FIG. 11. It is a matter of personal perspective as to which of the two mappings, FIG. 11 or FIG. 12, more clearly describes the difference between those locations which contain three word intersections, two word intersections or zero word intersections.

As the above description demonstrates, there are many ways to map a text. Once a text is mapped in two or more different ways, the different mappings may, in turn, be used in a variety of ways to achieve a number of different results. Information from two or more maps may be combined in whole or in part into a new textmap. Two or more maps can be compared by sequential display, by juxtaposition, by superimposition or by animation (very rapid sequential display).

Textmapping may be practiced, in its simplest form, as a pencil and paper process directly upon a text. For example, one can photocopy the pages from a text, tape the photocopied pages together into a scrolled textscape and map it. One can also print text from a computer on an overhead projector to project the image of the text onto a wall or screen.

Textmapping may also be practiced on text displayed on a computer screen. Existing computer graphics software, including pen technology for computers, may be used in much the same way as pencils, pens and colored markers are used to map a text displayed on paper. In addition, elements of existing software programs, such as the search functions employed in most word processing software packages, can be used to quickly locate selected features in a text. Existing statistical software packages may be used to perform the statistical analysis which serves as the basis for statistical textmapping.

It will be understood that a person skilled in the art can make many variations to the exemplary embodiment of the present invention as described above. All such variations and modifications are intended to be included in the scope of the present invention as defined by the appended claims.

What is claimed is:

1. A method of producing a representation of text to enable a person to obtain some comprehension of said text without reading all of said text, comprising the steps of:

identifying at least one feature contained within at least a portion of said text;

creating at least one representation of said portion of said text, wherein said representation of said portion of said text does not include any readable words but does include a graphical indication that indicates the presence of said at least one feature at at least one location within said at least one representation.

2. The method according to claim 1, wherein said step of identifying at least one feature includes identifying the most frequently occurring noun within said portion of said text.

3. The method according to claim 1, wherein said step of identifying at least one feature includes identifying the most frequently occurring nouns within said portion of said text.

4. The method according to claim 3, wherein said step of creating at least one representation includes creating multiple representations of said portion of said text wherein each of said representations includes a graphical indication that indicates the presence of one of said frequently occurring nouns at at least one location therein.

5. The method according to claim 4, further including the step of creating a composite representation from each of said representations, wherein said composite representation illustrates areas within said portion of said text common to at least two of said representations.

6. The method according to claim 3, wherein said step of creating at least one representation includes creating a representation that indicates locations within said portion of said text that contain more than one frequently occurring nouns.

7. The method according to claim 1, wherein said step of identifying at least one feature includes the substeps of:

analyzing all feature instances within said portion of said text;

eliminating from consideration features having only a single instance;

eliminating from consideration features that are not possibly nouns, thereby resulting in a group of eligible features that are possibly nouns and occur more than once in said portion of said text.

8. The method according to claim 7, further including the substeps of:

categorizing said eligible feature into groups sharing substantially the same meaning as a dominant word within each group;

considering all words within one of said groups to be the same as the dominant word for that group;

identifying the most frequently occurring dominant words within said portion of said text.

9. The method according to claim 8, wherein said step of creating at least one representation includes creating a representation for each of said most frequently occurring dominant words.

10. The method according to claim 9, further including the step of creating a composite representation from each representation for each of said most frequently occurring dominant words, wherein said composite representation illustrates areas within said portion of said text common to at least two of said dominant words.

11. The method according to claim 1, wherein said step of creating at least one representation of said portion of said text includes the substeps of:

reducing said portion of said text to an illegible size;

displaying the reduced text in an uninterrupted format on a common backing.

12. The method according to claim 1, further including the step of displaying said at least one representation in a three dimensional format.

13. A method of producing a representation of text contained within a document to enable a person to obtain some comprehension of said text without reading said text, comprising the steps of:

creating an image of said text wherein individual words of said text are not discernable within said image;

identifying at least one textual feature contained within said text;

illustrating on said image the areas of said text that contain said at least one textual feature.

14. The method according to claim 13, wherein said step of creating an image includes displaying all of said text as a single image.

15. The method according to claim 13, wherein said step of identifying at least one textual feature includes identifying words in said text having generally the same definition.

16. The method according to claim 13, wherein said step of identifying at least one textual feature includes identifying multiple textual features.

17. The method according to claim 16, wherein said step of illustrating on said image the areas of said text that contain said at least one textual feature includes illustrating the areas of said text that contain at least two of said textual features.

18. The method according to claim 13, wherein said step of identifying at least one textual feature includes the substeps of:

analyzing all feature instances within said text;

eliminating from consideration features having only a single instance;

eliminating from consideration features that are not possibly nouns, thereby resulting in a group of eligible words that are possibly nouns and occur more than once in said text.

19. The method according to claim 18, further including the substeps of:

categorizing said eligible words into groups sharing substantially the same meaning as a dominant word within each group;

considering all words within one of said groups to be the same as the dominant word for that group;

identifying the most frequently occurring dominant words within said text.

20. The method according to claim 19, wherein said step of illustrating on said image the areas of said text that contain said at least one textual feature includes illustrating the areas of said text that contain at least two of said most frequently occurring dominant words.

* * * * *

US005713740C1

(12) EX PARTE REEXAMINATION CERTIFICATE (8135th)

United States Patent
Middlebrook

(10) Number: US 5,713,740 C1
(45) Certificate Issued: Apr. 5, 2011

(54) SYSTEM AND METHOD FOR CONVERTING WRITTEN TEXT INTO A GRAPHICAL IMAGE FOR IMPROVED COMPREHENSION BY THE LEARNING DISABLED

(75) Inventor: R. David Middlebrook, Princeton, NJ (US)

(73) Assignee: Textscape Technologies, Inc., Princeton, NJ (US)

Reexamination Request:
No. 90/010,941, Apr. 2, 2010

Reexamination Certificate for:
Patent No.: 5,713,740
Issued: Feb. 3, 1998
Appl. No.: 08/655,699
Filed: Jun. 3, 1996

Related U.S. Application Data

(63) Continuation-in-part of application No. 08/184,493, filed on Jan. 18, 1994, now Pat. No. 5,556,282.

(51) Int. Cl.
*G09B 21/00* (2006.01)

(52) U.S. Cl. ................. 434/178; 434/167; 434/156; 434/159

(58) Field of Classification Search ................. None
See application file for complete search history.

(56) References Cited

U.S. PATENT DOCUMENTS

| | | | |
|---|---|---|---|
| 5,510,808 A | 4/1996 | Cina, Jr. et al. | |
| 5,623,588 A | 4/1997 | Gould | |
| 5,945,998 A | 8/1999 | Eick | |

OTHER PUBLICATIONS

Church, Kenneth W. and Jonathan Isaac Helfman. Dotplot: A Program for Exploring Self–Similarity in Millions of Lines of Text and Code, J. of Computational and Graphical Statistics, vol. 2, No. 2 (Jun. 1993). pp. 153–174.

Eick, Stephen G., Joseph L. Steffen, and Eric E. Summer Jr. *Seesoft—A Tool for Visualizing Line Oriented Software Statistics,* IEEE Transactions on Software Eng'g, vol. 18, No. 11 (Nov. 1992), pp. 957–968.

Kozima, Hideki. Text Segmentation Based on Similarity Between Words, Proceedings of the 31st Annual Meeting of the Association for Computational Linguistics, Columbus, OH (Jun. 1993), pp. 286–288.

Brill, Eric. A Simple Rule–Based Part of Speech Tagger, Speech and Natural Language: Proceedings of a workshop held at Harriman, New York, Feb. 23–26, 1992, pp. 112–116.

Church, Kenneth Ward. A Stochastic Parts Program and Noun Phrase Parser for Unrestricted Text, Proceedings of the Second Conference on Applied Natural Language Processing, Austin, TX, Feb. 9–12, 1988, pp. 136–143.

Church, Kenneth Ward. Word Association Norms, Mutual Information, and Lexicography, Computational Linguistics, vol. 16, No. 1 (Mar. 1990), pp. 22–29.

*Primary Examiner*—Beverly M. Flanagan

(57) ABSTRACT

A system and method which enables individuals to rapidly and accurately obtain information about the contents of a written text without having to read the words of the text. Written text, which is comprised of graphic markings that represent linguistic sound, forms a graphic image. This graphic image can be mapped in various ways to illustrate and provide insight about the structure and content of the text with regard to one or more selected features. Individuals can perceive the graphic information contained in the text using parafoveal and peripheral vision, thereby enabling those individuals to process the graphic information using visual/spacial cognitive abilities. The present invention system and method therefore enables a person to understand a large amount of information about the body of written text without reading the words comprising the body of written text. The image of the text is then mapped in various ways to illustrate, without words, the various features of the text that provide insight into the contents of the text.

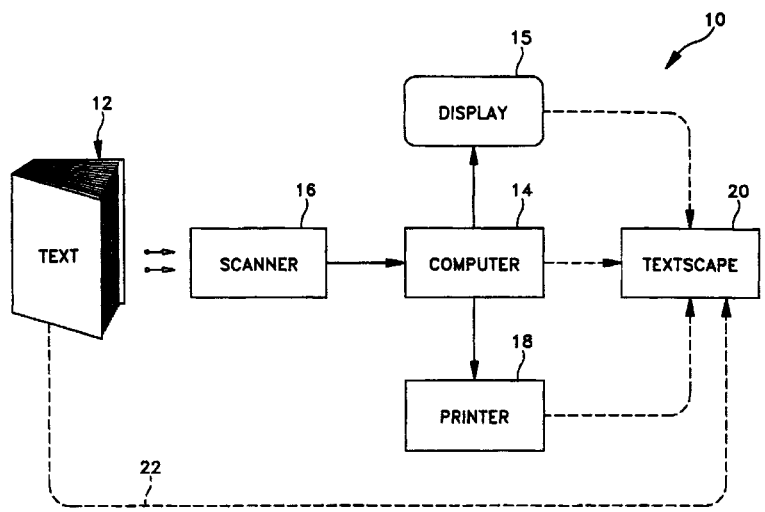

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 and 11-17 are cancelled.

Claims 7-10 and 18-20 were not reexamined.

* * * * *